United States Patent
Wulff (10) Patent No.: US 7,409,571 B2
(45) Date of Patent: **\*Aug. 5, 2008**

(54) SYSTEMS AND METHODS FOR A CONTROLLABLE RELEASE OF POWER SUPPLY IN A MOBILE DEVICE

(75) Inventor: Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/693,773

(22) Filed: Mar. 30, 2007

(65) Prior Publication Data

US 2007/0165480 A1    Jul. 19, 2007

Related U.S. Application Data

(62) Division of application No. 10/611,638, filed on Jul. 1, 2003, now Pat. No. 7,299,373.

(51) Int. Cl.
*H01R 13/66* (2006.01)

(52) U.S. Cl. ............... 713/330; 713/300; 713/320; 320/112; 320/113; 320/114; 320/115; 429/97

(58) Field of Classification Search ......... 320/112–115; 429/97–100; 713/330, 300, 320
See application file for complete search history.

(56) References Cited

U.S. PATENT DOCUMENTS

| | | | |
|---|---|---|---|
| 5,293,109 A * | 3/1994 | Fischl et al. ............... | 320/112 |
| 5,401,592 A | 3/1995 | Gilpin et al. | |
| 5,467,469 A | 11/1995 | Saito et al. | |
| 5,481,730 A | 1/1996 | Brown et al. | |
| 5,762,512 A | 6/1998 | Trant et al. | |
| 5,832,282 A | 11/1998 | Pate et al. | |
| 6,051,334 A | 4/2000 | Tsurumaru et al. | |
| 6,081,752 A | 6/2000 | Benson, IV et al. | |
| 6,225,777 B1 * | 5/2001 | Garcia et al. ............... | 320/112 |
| 6,302,454 B1 | 10/2001 | Tsurumaru et al. | |
| 6,304,981 B1 | 10/2001 | Spears et al. | |
| 6,463,492 B1 | 10/2002 | Engfer et al. | |
| 6,587,951 B1 | 7/2003 | Flanigan | |
| 6,847,192 B2 | 1/2005 | Turner et al. | |
| 7,019,420 B2 * | 3/2006 | Kogan et al. ............... | 307/150 |
| 7,176,655 B2 * | 2/2007 | Kogan et al. ............... | 320/112 |
| 7,299,373 B2 * | 11/2007 | Wulff ......................... | 713/330 |

OTHER PUBLICATIONS

Yung-Hsiang Lu, Luca Benini, and Giovanni De Micheli. Requester-Aware Power Reduction. Proceedings of the International Symposium on System Synthesis, IEEE, 2000. 6 pages.

* cited by examiner

*Primary Examiner*—Gary F. Paumen
(74) *Attorney, Agent, or Firm*—Amin, Turocy & Calvin, LLP (57) ABSTRACT

Systems and methods are disclosed for removing a power supply from a host unit running a computer program, without losing data or causing a cold boot. The present invention employs a retaining assembly for the power supply that delays removal of the power supply until shutting down of the computer program of the host unit. The system may further comprise a logic unit that estimates the period from initiating a power off for the unit, up to an actual shut down of the computer program.

17 Claims, 10 Drawing Sheets

PRESS BUTTONS 20 IN DIRECTION OF ARROW 19

SYSTEMS AND METHODS FOR A CONTROLLABLE RELEASE OF POWER SUPPLY IN A MOBILE DEVICE

CROSS-REFERENCE TO RELATED APPLICATIONS

This application is a divisional of U.S. patent application Ser. No. 10/611,638, filed Jul. 1, 2003, entitled "SYSTEMS AND METHODS FOR A CONTROLLABLE RELEASE OF POWER SUPPLY IN A MOBILE DEVICE". The entirety of the aforementioned application is incorporated herein by reference.

TECHNICAL FIELD

The subject invention generally relates to power supply latching mechanisms and more particularly to systems and methods for controllably removing a power supply from a host unit that runs a computer program, without loss of data associated with the host unit.

DESCRIPTION OF THE RELATED ART

Generally, portable or hand held electronic devices, such as cellular phones, laptop computers, bar code scanners and the like can include a replaceable and/or a rechargeable battery pack comprised of various battery cells. When one battery pack or a battery cell unit is depleted, it can be removed and replaced with another fully charged battery pack, with the depleted battery pack or unit being recharged or disposed of. A battery pack can typically include a sealed enclosure which contains rechargeable batteries. Contacts on the exterior surface of the battery pack mate with contacts on the electronic device or interior terminal contact, upon the battery pack being mounted on the electronic device.

Such battery packs employ various types of latching mechanisms to assemble with a host unit. One of the most common types of mechanisms is a simple plastic cantilever latch. This type of latch comprises a cantilever or beam which is anchored at one end and carries a latch element at the opposite end. The cantilever or beam is deflected in order to engage or disengage the latch. For such mechanisms, long cantilevers are preferred over short cantilevers because longer cantilevers allow for greater deflection, which in turn allows for greater latch engagement. Moreover, in order to make the plastic cantilevers strong, it is often necessary to make them thick. Thick cantilevers require greater effort than thin beams to deflect. If low efforts are desired, then the cantilever must be made thinner or longer.

An alternative to cantilever latches, are spring-loaded cam latches. In this type of latch, a metal leaf spring or coil spring is used to urge a latch member to an engaged position. The latch member often includes a camming surface which is engaged by an actuator element to move the latch member to a disengaged position. Spring-loaded latches have several advantages over cantilever latches. The metal springs provide a smoother, almost constant latch effort. It is easier to design latch mechanisms with the desired latch force, travel and feel without the trade-offs of cantilever latches. The space requirements for spring-loaded latching mechanisms is often less than cantilever latches, which is important as electronic devices become smaller and more portable.

Generally, it is possible that such latching mechanism disengage a battery, or a removable power supply, as a result of unintentional or accidental circumstances. Such disengagement of a battery pack from a host unit can increase a risk of damage to the host unit, as well as the battery pack, and can also cause a loss of data. In particular, for many electronic devices that employ volatile memories or caches, a loss of power prior to a proper shut down of the unit can erase the memory and associated computer programs, applications, and/or software.

One approach to mitigate a loss of data contained in a volatile cache is the use of a supplemental battery to power the cache or other memory elements. If a host system's power is lost, data contained within the cache is retained because memory continues to be powered by the battery. When system power is restored, the system resumes normal operation and valid data still resides in the cache waiting to be written-back to disk. This solution is dependent upon the battery having power to retain the memory in the cache for a period that the system has no power. If the battery is exhausted during the interval when there is no system power, data contained in the cache will be lost. Because battery power is finite and memory circuits such as dynamic memory devices require refreshing at regular intervals, i.e. consuming power at a fairly high rate, special care must be taken that the battery has the capacity to retain the data. Nonetheless, batteries sometimes suffer from reliability problems that may result in premature failure, so the loss of data in a battery-backed cache may still occur.

At the same time, as clock speeds for various electronic circuits increase and portable host units become ever increasingly adaptable to operate with clients' proprietary applications and/or software, the time required for a proper shut down of the system, i.e. close of the associated programs after an initial powering off, has increased dramatically. As such, a battery removal from the host unit even after an initial powering off, and before a proper shut down of the system, can still cause a loss of data and/or cold boot of the system to occur. Such a cold boot can create significant problems in the host unit systems, for example by damaging the integrity of data files stored thereon or erasing a proprietary application and software.

Therefore, there is a need to overcome the aforementioned deficiencies associated with conventional devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The present invention provides for methodologies and systems for a proper shut down of host unit(s) having a removable power supply, e.g. a battery cell. Such shut down minimizes a risk for host unit's data loss and/or cold boot and can occur during or prior to battery removal.

In one aspect of the subject invention methodologies and systems are provided for detaching a battery from a host unit in a controlled manner after powering down of the unit. The system employs a latch/catch mechanism that enables a battery removal in several stages. The latch/catch retaining assembly is adapted so that after initiating a powering down for a host unit, there is ample time for a proper shut down, (i.e. close of computer programs, applications, or the like without data loss), before removal of the battery or power supply. Accordingly, a risk for a cold boot and/or a power jolt for the host unit is reduced.

One exemplary aspect according to the present invention provides for removal of a battery pack in a dual stage, after initiating a powering off for the host unit. A latch/catch mechanism having movable latch members and catch elements is provided as part of the host unit. Such mechanism is adapted for enabling a user to remove the battery package from the host device in two stages. Initially, by pushing a button(s) operationally connected to a first movable latch member, the battery is released from a catch element to a certain extent, such that it still remains operative with the host unit. In a second stage, by pressing secondary latch member (s), the battery is detached and operatively fully disengaged from the host device. Such dual stage mechanism induces a delay period in an operator's routine attempt to change battery, (e.g. 1 sec.-3 secs.), which in turn allows the proper shut down of the host device. Accordingly, a proper shut down occurs after initiating a power down and before the battery is operatively disengaged from the host unit.

In another aspect of the present invention an attempted removal of a battery, before a powering off for the unit, triggers an auto shut down mechanism. Such auto shut down mechanism, in conjunction with the multi stage removal procedure, can provide a necessary time delay for the unit to shut down properly before the battery is operatively disconnected from the host unit. The auto shut down mechanism can comprise a switch that is triggered upon the contact pins of the battery being slightly pulled out form their respective sockets in the host device.

In another aspect, the subject invention provides for a battery disengagement procedure and assembly that is tied up and operatively coupled to a software program, such as an application of the host unit. This is advantageous, for example, when an application employed by the host unit requires a specific time delay period for its proper shut down after initiating a powering down of the host unit. Thus, only after such time delay should the battery power disconnect from the unit. Otherwise, a cold boot of the host unit can occur.

According to one aspect of the present invention, the disengagement assembly provides for a locking mechanism of the battery compartment via employing an actuator and a sliding pin mechanism. When the host unit is powered off, and upon the proper closing of the applications, the locking mechanism is gradually released to unlock the battery compartment and permit access to the battery. Such method of disengagement provides for a battery release from the host unit that is adaptable to the type of applications loaded on the host unit at the time. Such adaptability proves advantageous should users employ their proprietary soft ware and application with the host unit. For example, a user may employ the unit with an application that after powering off for the unit requires a 10 second time frame to close properly and save the required data. If the battery is operatively disconnected prior to 10 seconds, a cold boot will occur. An emergency unlocking mechanism can also provide access to the battery chamber in case the application or the associated software program of the host unit fails, e.g. host unit freezes.

In one aspect of the present invention, the emergency unlocking mechanism can be a mechanical latch and catch design that can be opened by inserting an object therein, e.g. by inserting a paper clip and unlocking the latch mechanism. Moreover, according to another exemplary aspect of the present invention, an actuator assembly may be employed to eject the battery form the compartment upon pressing a button on the host unit and after initiating a powering down.

According to another aspect of the present invention an artificial intelligence element is provided as part of the unlocking mechanism. Based on a host unit's application or computer program, an artificial intelligence element can provide an estimate for the time required to properly shut down the host system after initiating a power off. Such estimate can be based on prior instances that the unit has been powered off and the actual time it took for closing of all programs and proper shut down of the unit. The time estimate can also be provided by an operator to the host unit. The time estimate is subsequently supplied to the unlocking mechanism for permitting access to the battery compartment.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings. Also, to facilitate the reading of the drawings, some of the drawings may not have been drawn to scale from one figure to another or within a given figure.

DETAILED DESCRIPTION OF THE INVENTION

The invention provides for methodologies and systems for a proper shut down of a host unit with removable power supply. The host unit employs a power supply locking and release assembly adapted to avoid loss of data from a cold boot and/or a power jolt, while removing the power supply.

The invention can be applied to any portable electronic unit having a removable power supply, such as a mounting battery. Examples of portable electronic devices include; a portable hand scanner unit or bar code reader, transmitter, receiver, computer, personal electronic organizers, electronic navigation devices, and any electronic unit having an auxillary battery power with a removable battery cell.

Figure 1:
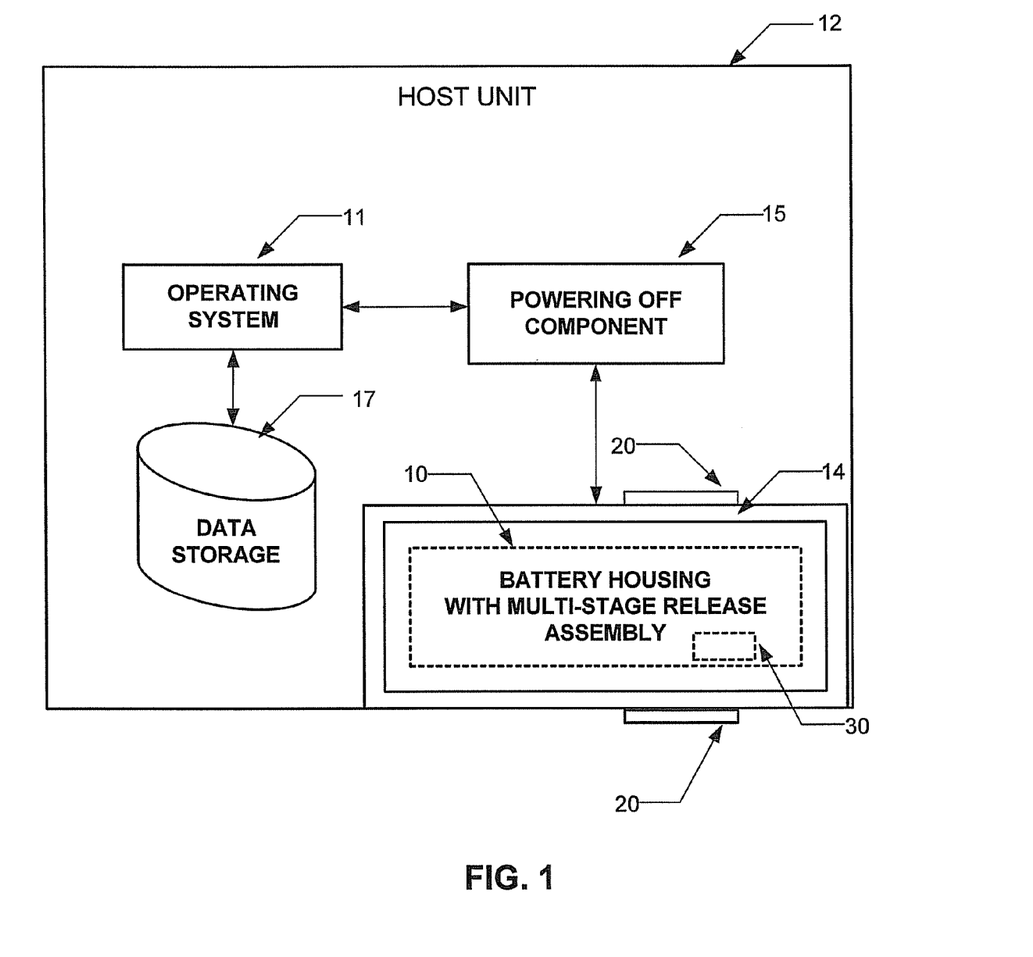
FIG. 1 is a schematic diagram illustrating a system that hosts a battery with a multi-release mechanism according to an aspect of the present invention.
Figure 2A:
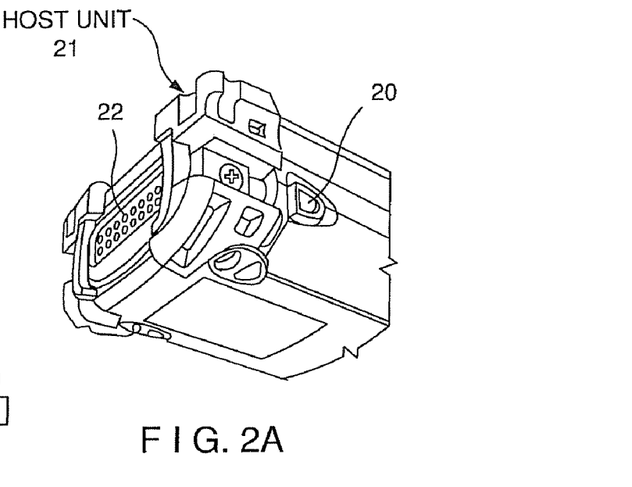
FIG. 2 illustrates a dual stage process for removing a battery cell from a host unit according to one aspect of the present invention.
Figure 2B:
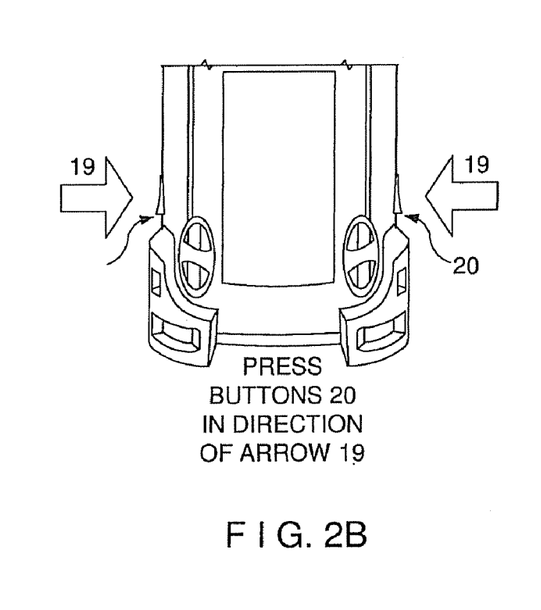
Figure 2C:
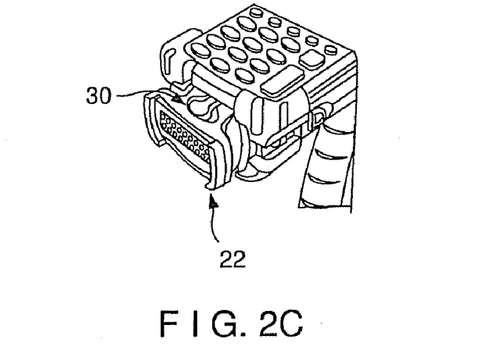
Figure 2D:
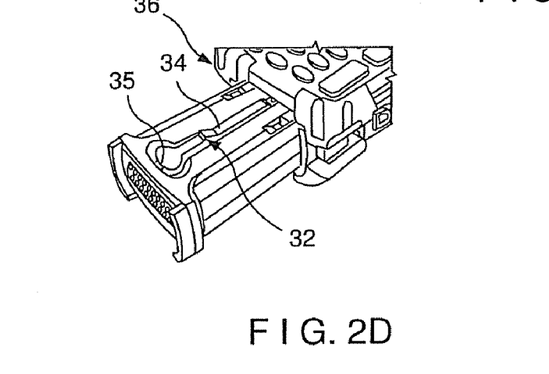

Referring initially to FIG. 1, an exemplary schematic system is illustrated that hosts a battery coupled to a release mechanism according to one aspect of the present invention. The host unit 12 can have an operating system 11 regulated by a powering off component 15 that controls the host unit's power. The host unit 12 derives its power from a battery unit(s) 10 contained within a housing 14. The operating system 11 and an associated CPU (not shown) interact with a data storage assembly 17.

The data storage assembly 17 typically includes an array of memory cells, wherein each memory can be manufactured in accordance with a 1 Mbit, 2 Mbit, 8 Mbit or similar storage cells and as a volatile memory IC. Such memory cells can have two or more states corresponding to various levels of impedance. These states are set by applying a bias voltage, and then the cells remain in their respective states until another voltage, in reverse bias, is applied. Accordingly, each memory cell of data storage 17 can be accessed or "read", "written", and "erased" with information. The memory cells maintain information in an "off" or an "on" state (e.g., storage is limited to 2 states), also referred to as "0" and "1". To store this information, a memory cell may include a capacitor structure that permits storage of a charge allowing the memory cell to keep a single bit of information. Such memory cells typically employ a refresh signal to maintain the charge on the capacitor and/or their information. Some examples of the memory storage 17 are memory devices such as dynamic random access memory (DRAM), double data rate memory (DDR), flash memory, metal oxide semiconductor field effect transistor (MOSFET), and the like.

The host unit 12 further comprises a battery housing 14 having a multi stage release assembly that permits detaching battery 10 therefrom in a controlled manner. The release assembly comprises the battery housing 14, a first catch and latch mechanism, which can be positioned laterally to the battery housing 14, and a second catch and latch mechanism 30.

The first catch and latch mechanism can include a pair of buttons 20 extending from the exterior of the battery housing 14. The buttons 20 can be fabricated from the same materials employed for fabricating the battery housing 14 and can include various types of thermoset plastic or thermo plastic material, and the like. In addition, the buttons 20 can further include a flex spring sheet mechanism (not shown) attached to the interior of the battery housing 14.

The buttons 20 can hinge on pins on their interior ends that contact the spring sheet mechanism, so that the spring sheet deflects when the buttons 20 are displaced. The buttons 20 can be positioned in a cavity of the battery housing 14, e.g. an orifice, a channel and the like. In one exemplary aspect, when the spring sheet is deflected, the catch/latch mechanism of the buttons 20 release or catch a projection of the battery 10. The buttons 20 can also include cams or wheels rotating on a shaft, at their ends that can deflect the flex spring sheet causing the release or engagement of the projection on the battery unit 10.

FIG. 2 illustrates a dual stage process for removing a battery cell 22 from a host unit 21 according to one aspect of the present invention. Upon inward squeezing of the buttons 20 as illustrated by the arrows 19, the first latch/catch mechanism is released. Subsequently, the battery cell 22 slides out of the host device 21 to a predetermined length, for example ½", and into an intermediate position as illustrated. This predetermined length is selected such that the battery cell 22 still remains operatively coupled with the host unit 21, and thus still provides power thereto. Put differently, a sliding out of the battery 22 to this intermediate position does not electrically disconnect the power from the host unit 21. At this time, and when the battery cell 22 reaches this intermediate position, the secondary latch/catch mechanism 30 operates to withhold further sliding out of the battery from its compartment. In one exemplary aspect according to the subject invention, the secondary latch/catch mechanism 30 can include a notch 32 mounted on a strip 34. The strip 34 can move perpendicular to a direction the strip 34 is extended when pressed at the disc shaped area 35.

Upon the first latch/catch mechanism 20 being disengaged, the secondary latch/catch mechanism 30, e.g. notch 32, engages with an edge 36 of the host device 21, thus creating a reactive force that acts in a direction opposite to sliding direction of the battery cell 22. Such reactive force maintains the intermediate position for the battery 22. By pressing a disc shaped area 35 on the strip 34, the strip 34 moves downward and lowers the notch 32 from its engaged position. The disc shaped area can, for example, act as a thumb pad when pressed by an operator's thumb. The lowering of the strip 34 can continue until the notch 34 disengages from its contact with the edge 36, thus allowing sliding out of the battery cell 22 from its compartment. During the period from releasing from the first latch/catch assembly and disengagement from its second latch/catch assembly, the battery cell 22 continues to provide power to the host unit 21.

According to one aspect according to the present invention, this dual release methodology provides for a time delay, which serves as a period for allowing the host unit 21 to properly shut down. Put differently, there exists a time lag or delay from the time the host unit 21 is powered off, until the time that the unit closes all associated applications and/or software and actually shuts down. By delaying the battery cell removal from the host unit 21 for duration longer than a required shut down period, the subject invention provides for a proper shut down of the host unit after initiating its powering off. This avoids a possible cold booting of the system that can arise from a premature withdrawal of the battery cell 22 from the host unit 21. For example, before associated applications and software programs have been properly closed and required data saved. The dual release methodology delays battery removal for about one to three seconds. Longer delay times can be achieved by additional catch/release mechanisms or by employing other aspects of the present invention as will be described hereinafter.

Figure 3:
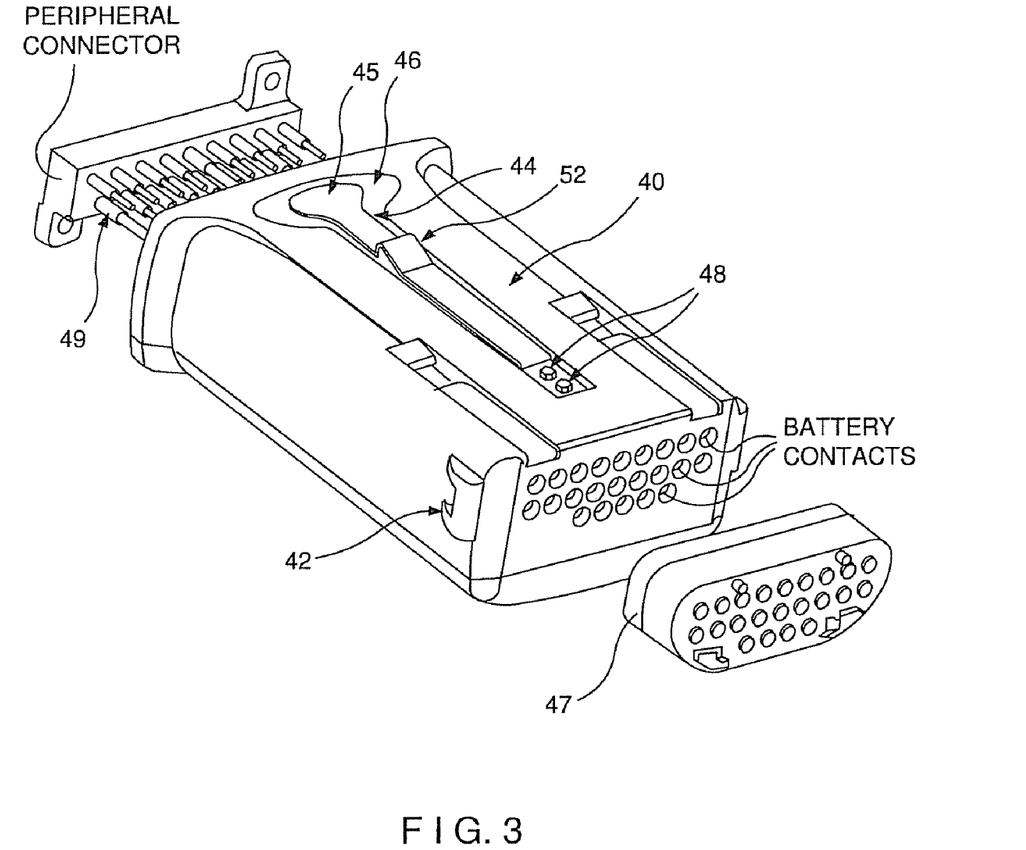
FIG. 3 illustrates a battery cell with features according to one aspect of the present invention.

Referring now to FIG. 3 a battery cell 40 removed from its compartment is depicted. The battery cell 40 can be a rechargeable battery comprised of a Lithium-Ion (Li-ion) Nickel-Cadmium (Ni—Cd), Nickel-Metal-Hydride (NiMH), Sealed-Lead-Acid (SLA), Lithium Polymer (Li-Pol)). Battery cell 40 can also be part of an array of battery cells assembled together as part of a power unit in an electronic device. The battery cell 40 can include side latch features 42 that function as part of a lateral catch/latch mechanism described earlier. A strip 44 having a wider width at one end 45 is secured via a pin set 48 over a trough 46 being formed on a surface of the battery cell 40. The strip 44 can be fabricated from a conductive material such as copper, Aluminum or the like. At a selected section along the strip 44, the metal is curved to from a notch 52 that acts as the secondary latch/catch mechanism described earlier. The pin set 48 secures the strip metal 44 such that it behaves as a cantilever member extending over the trough 46. This allows for the strip 44 to move downward at a substantially perpendicular direction to the direction that the strip 44 extends. Upon exerting a downward force at 45, such as by pressing of a thumb, part of the strip 44 moves in to the trough 46, thus lowering notch 52 and disengaging it from contacting a body of the host unit.

According to one aspect of the present invention, a safety switching mechanism can be provided as to trigger the automatic powering off for the host unit, should one attempts to remove the battery cell 40 without initially having powered off the host unit. Such safety switching mechanism for the host unit can be triggered, for example via a contact of a projection on the battery cell body with a lever, during sliding out of the battery sockets from the finger leads of the terminal internal connector 47 of the battery compartment. Typically, positive and negative battery sockets are engaged by resilient contact portions of the positive and negative finger leads which project into the battery cell cavities. For example, such a resilient member for a peripheral connector is shown as element 49 in FIG. 3. Similar elements (not shown) exist for the terminal internal connector 47 of the host unit.

Figure 3A:
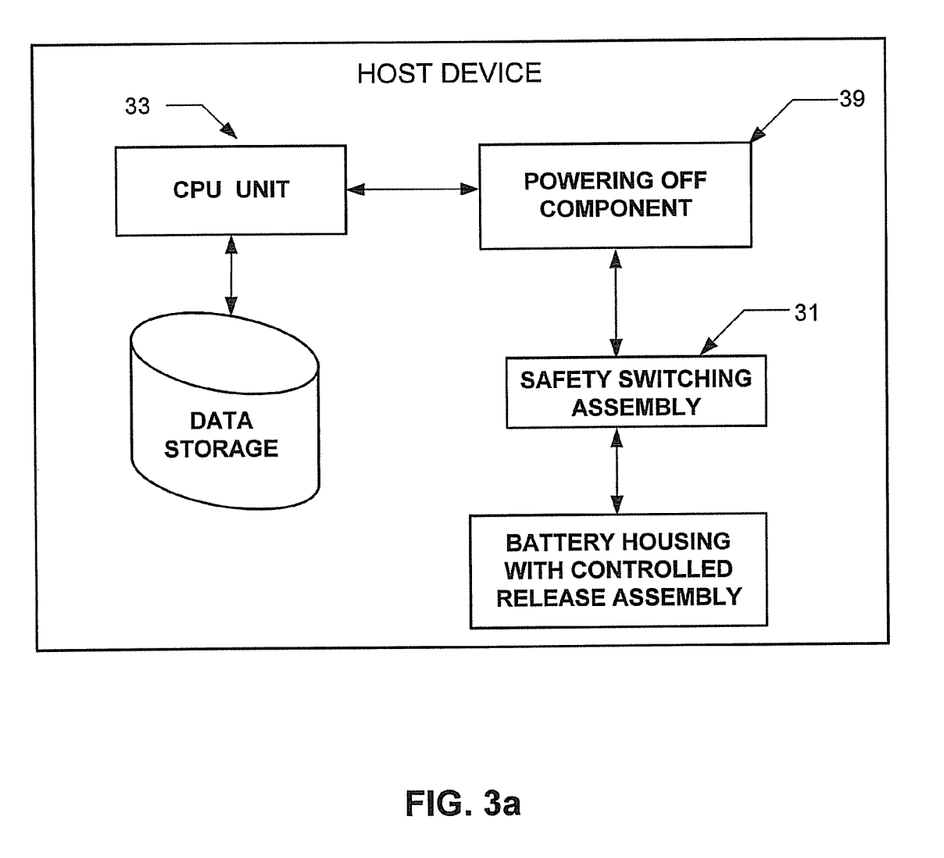
FIG. 3a illustrates an exemplary schematic of a system with an automatic powering off mechanism according to the present invention.

FIG. 3a illustrates an exemplary schematic system with a safety switching mechanism. The safety switching assembly 31 is coupled with a powering off mechanism 39, which in turn is operatively connected to a CPU 33 for regulating its powering off. Upon receiving a powering off notification alert generated via the safety switching assembly 31, the powering off component 39 is prompted for an immediate shutdown of CPU 33 and saving of all required data into the data storage area. The notification alert can be in a form of a signal or a voltage change or any other electrical and/or mechanical stimulus. Such auto powering off for the host unit, in conjunction with the dual release methodology for the battery cell will lead to a proper shut down of the CPU unit 33, when an there is an unintentional attempt for battery removal. Accordingly, the illustrated system can provide for a time delay, for example of about one to three seconds, which serves as a period that allows proper shut down to take place for the host unit. Such assembly provides an improved latching mechanism that permits a battery disengagement from a host unit with a time delay that is typically required for the proper shut down of the host unit. Accordingly, a cold boot that results in loss of system's data can be avoided. Desirable time delays may also be achieved by a tie-up of the host system's application and/or other software, with the battery release mechanism, as explained herein after.

Figure 4:
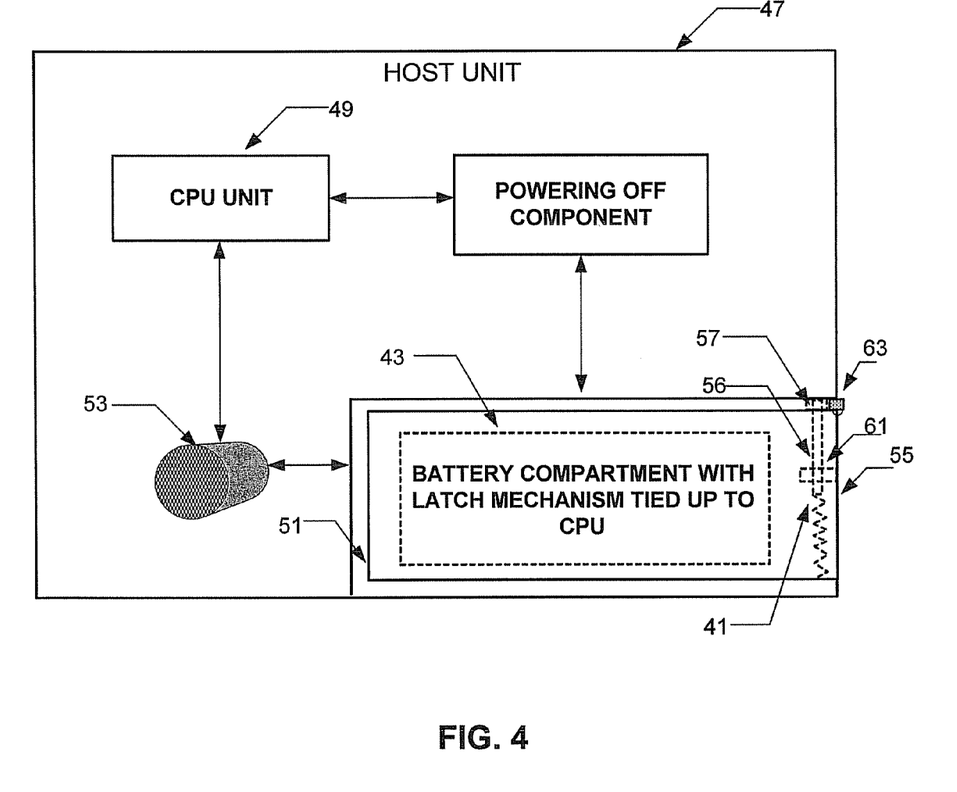
FIG. 4 is a schematic diagram illustrating a system with a battery release mechanism that is tied up to an application and/or software program being run by the host unit.

Referring now to FIG. 4, an exemplary schematic is illustrated according to one aspect of the present invention. The illustrated latching system 41 for detaching a battery 43 from a host unit 47 is tied up to an application and/or software program being run by the CPU 49 of the host unit 47. For example an application employed by the host unit 47 may require a ten second delay for its proper shut down. Accordingly, once a powering off for the unit has been initiated, a time delay of at equal ten seconds is required before the latching system 41 releases the battery 43 and operatively disconnects it from the host unit 47. Otherwise, a cold boot will occur.

The depicted CPU assembly 49 can include a volatile semiconductor memory such as the static random access memory (SRAM) which is characterized by low power consumption and high memory cell density. The generation of valid logic signals and the retention of data in such integrated memory circuits having volatile memory cells depend in part on maintenance of power supply voltage within specified limits. A sudden loss of voltage, e.g. through a removal of the battery cell 43 without proper shut down of CPU 49, will cause loss of any information stored in the memory cells, including programs and data. Although the loss of power does not necessarily result in memory circuit damage, the loss of stored information requires that the memory be reloaded with programs and data before processing can be resumed.

The battery cell(s) 43 is electrically connected to contacts on the interior of the battery compartment 51 which mate with corresponding contacts (not shown) on the electronic device 47 to supply it with power. The battery pack 43 is designed to be removably mounted to the electronic device 47. A latch mechanism 41 secures the battery pack 43 to the host unit.

According to one aspect of the present invention, an actuator 53 is being operatively connected to the latch mechanism 41 of the battery compartment 51. The battery compartment 51 can include a lid 55, which can be molded separately from the same material as the battery compartment 51, e.g., plastic and subsequently hinged thereto. A latch cavity 57 is formed on a wall of the battery component opposite the wall that the latching member 56 is attached. The purpose of the latch cavity 57 is to accept the latching member 56.

In one aspect according to the present invention, the latch assembly 41 comprises a latching member 56, as well as a latch cavity 57 formed on a side wall and operatively connected to an actuator 53. The actuator 53 urges the latching member 56 to move between an extended position as illustrated and a retracted position (not shown). In the extended position, the latching member moves parallel to the lid 55 and through a retaining member 61 attached thereto. Once the latching member 56 is in the extended position the lid 55, which permits access to battery compartment 51 can not be opened. Put differently, in an extended position the latching member 56 passes through the retaining member and locks into the cavity 44. Accordingly, the lid 55 can no longer be opened. In a retracted position (not shown), the latching member 56 is being retracted out of the cavity 57, as well as out of the retaining member 61 attached to the lid. Thus, the lid 55 of the battery compartment 51 can now be readily opened and the battery removed. It is to be appreciated that other mechanisms, such as electromagnetic assemblies, e.g. a solenoid, or the like may be employed alone or in combination with the actuator 53 to gradually release battery 43 form its compartment 51.

The function of the actuator 53 can be tied up with the proper shut down of the applications and/or software associated with the host unit 47 and its CPU 49. For example, the actuator 53 can urge a retracted position for latching member 56 upon receiving a stimulus from the CPU 49 alerting that the applications or softwares of the host unit 47 have been properly shutdown. The stimulus can be in the form of a signal or a voltage change or any other electrical and/or mechanical impetus. The actuator 53 is thus prompted to adopt a retracting status, upon the system being properly shut down. Thereafter, a removal of the battery cell from the host unit 47 does not create a cold boot of the system. The battery can then be manually removed by opening the lid 55.

According to another aspect of the present invention, the electronic device 47 can be supplemented with a mechanical emergency release assembly 63. Such emergency release mechanism 63 can be employed when the application and/or software associated with the host unit do not function as intended. This may occur for example as a result of a "freezing" of the system. If so, the latch assembly 41 can be disengaged by a mechanical procedure, for example inserting a paper clip via an opening provided as part of the release assembly 63. The inserted paper clip can then force the latch member 56 into a retracted position. The emergency release system 63 can be designed such that it is not readily accessible as to avoid unintentional access to it.

Figure 5A:
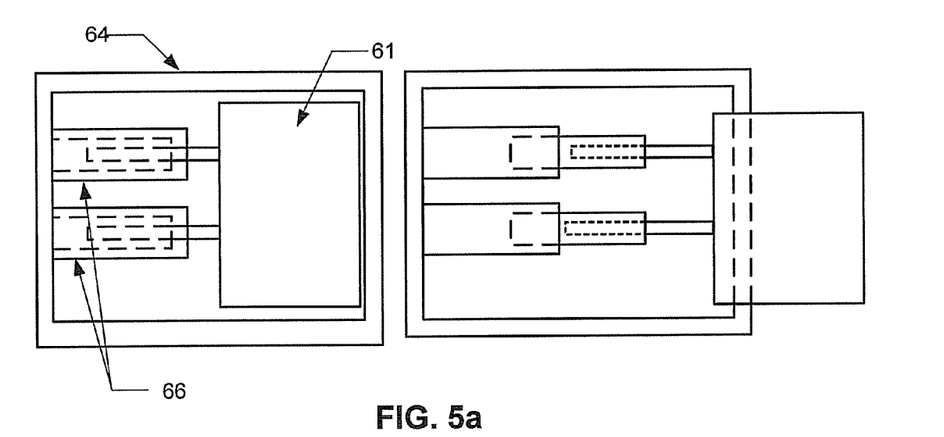
FIGS. 5a & 5b are schematic diagrams illustrating exemplary mechanisms for extending/retracting a battery cell from its compartment upon receiving a requisite stimulus in accordance with an aspect of the present invention.
Figure 5B:
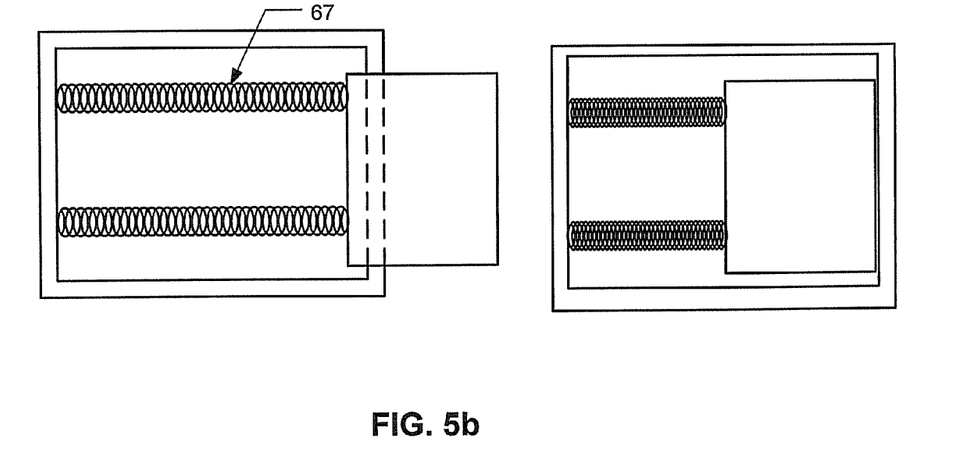

FIGS. 5a and 5b illustrate a battery compartment with a controlled latching mechanism in accordance with an aspect of the present invention. The battery compartment 64 is equipped with a pair of actuators 68 that can eject the battery 61 from its compartment 64 upon receiving a requisite stimulus. Such stimulus can be comprised of a user's request for removal of the battery pack, (e.g. by pressing a button), in conjunction with a notification by the CPU indicating that the host unit has been properly shut down. Upon receiving the proper stimulus the latch cavity adopts a retracted position as described earlier, (i.e. the latching member is being retracted out of the cavity and the retaining member attached to the lid). Thereafter, as illustrated in FIG. 5a the battery cell 61 is being pushed outwardly via a set of retracting/extending piston mechanism 66. After the battery 61 is removed, the retracting/extending piston mechanism 66 can then be retracted to their original positions. It is to be appreciated that other ejecting/retracting mechanisms may also be employed. For example, FIG. 5b illustrates an exemplary retracting mechanism comprised of coils springs 67 that may be applied for retracting an ejected battery back in to the battery compartment. The coil spring retracting mechanism 67 may also be employed with various other extending structures that are activated via an actuator.

Figure 6:
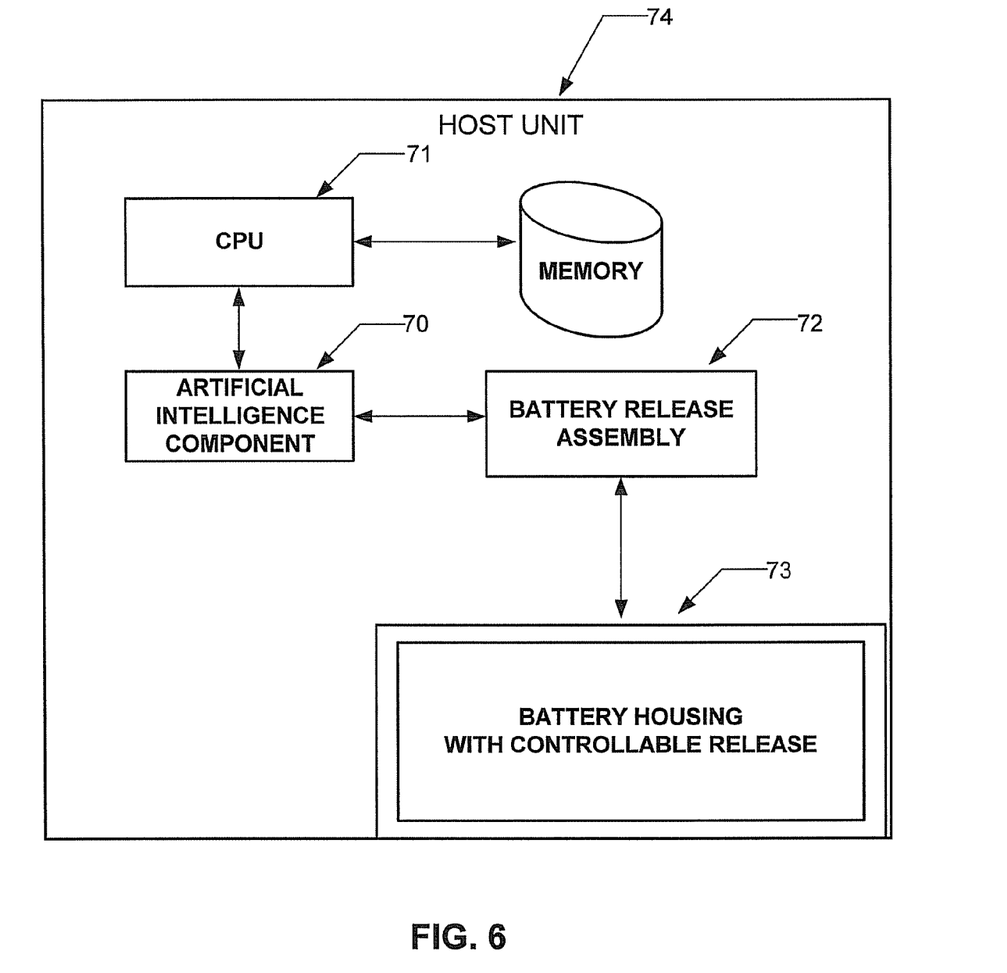
FIG. 6 illustrates a schematic diagram of a host system employing an artificial intelligence unit in accordance with an aspect of the present invention.

In another aspect according to the present invention, and as illustrated in FIG. 6 the system employs an artificial intelligence unit 70 operatively connected with the unlocking mechanism 72 and the CPU unit 71 of the host device 74. The artificial intelligence unit 70 provides a conservative time estimate of a required period for a proper shut down of CPU 71 and associated application to take place, after host device 74 is powered off. Such conservative estimate can, for example, be based on prior instances that the unit has been powered off and the time it actually took for closing of all application and proper shut down of the unit. During the normal use of host unit, such prior occasions of periods between powering off for the unit and actual shutting down of the system can be recorded by the logic unit and employed for deriving the conservative time estimate. Such time estimate can also be provided by an operator to the host unit. The time estimates are subsequently supplied to the unlocking mechanism for operating access to the battery compartment.

Figures 7A, 7B:
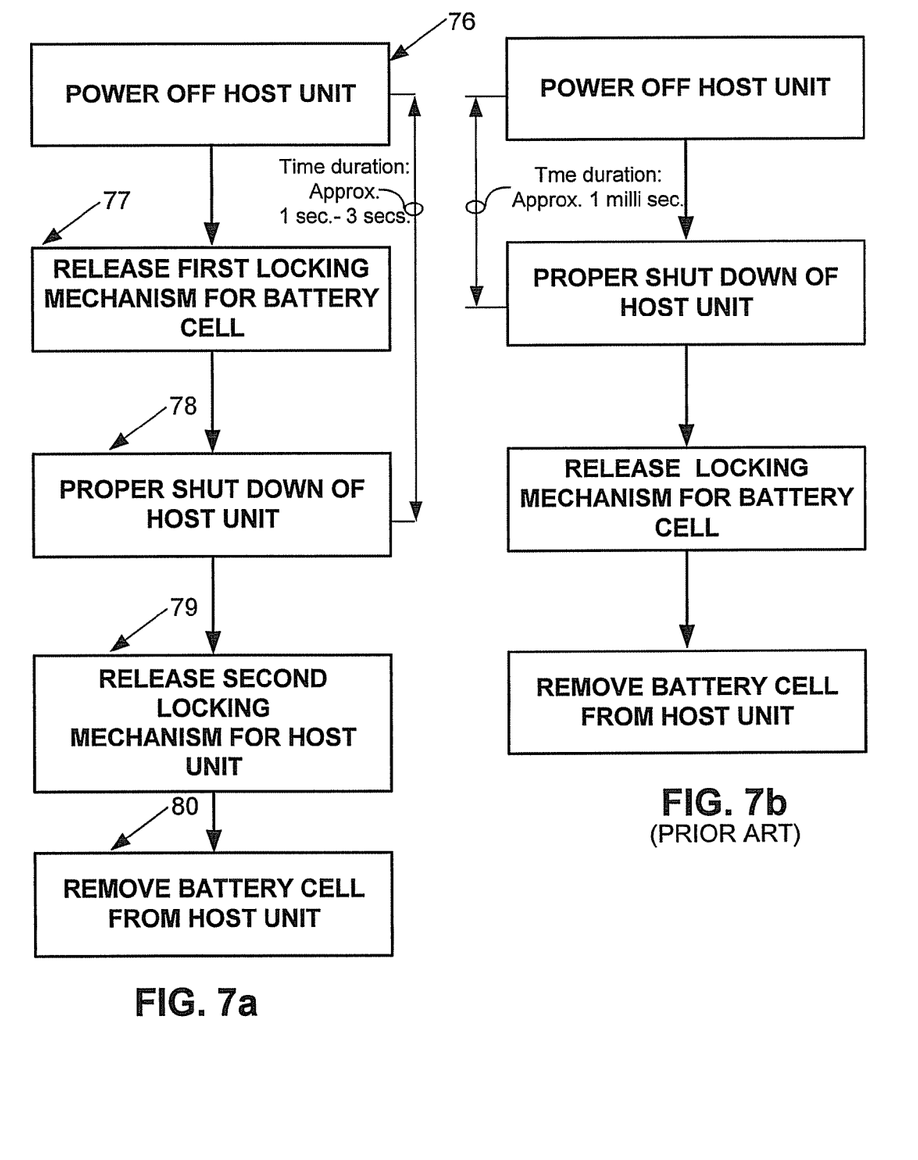
FIG. 7a is a flow chart diagram illustrating an exemplary method in accordance with an aspect of the present invention.
FIG. 7b is a flow chart diagram that illustrates prior art methodology.

Referring now to FIG. 7a, a flow chart illustrating a sequence of events according to one aspect of the present invention is illustrated and compared to conventional devices as illustrated in FIG. 7b. The system of FIG. 7a employs a dual latch mechanism as described earlier. At 76 the host unit employing a removable battery cell is being powered off for battery replacement purposes. Subsequently, at 77 the first latch mechanism is disengaged and the battery cell slides to an intermediate position. At this intermediate position the battery cell continues to provide power to the host unit. While a user is trying to disengage the battery cell from a secondary latch mechanism, the actual shut down of the system occurs at 78. Next at 79, the user releases the battery cell from a secondary latch mechanism. Such a methodology provides for an adequate time delay between releasing the first set of latches at 77 and the second set of latches at 79. Such a delay period can exceed the time frame required from an initial powering off until a proper shut down of a host unit. Accordingly, removal of battery cell at 80 from the host unit occurs at a time after the unit has been properly shut down and a cold boot is avoided.

In prior art methodologies as illustrated in FIG. 7b, typically due to the simplicity of the associated applications and/or software, a powering off for the unit caused a rapid shut down of the system, (e.g. 1 to 2 milliseconds). As such, there was no requirement for an induced time delay before removal of the battery cell.

While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, any be required to implement a methodology in accordance with the present invention. Moreover, it will be appreciated that the exemplary method and other methods according to the invention may be implemented in association with a dual staged battery release latch illustrated and described herein, as well as in association with other systems, such as a multi-staged release latch or other apparatus not illustrated or described.

Figure 8A:
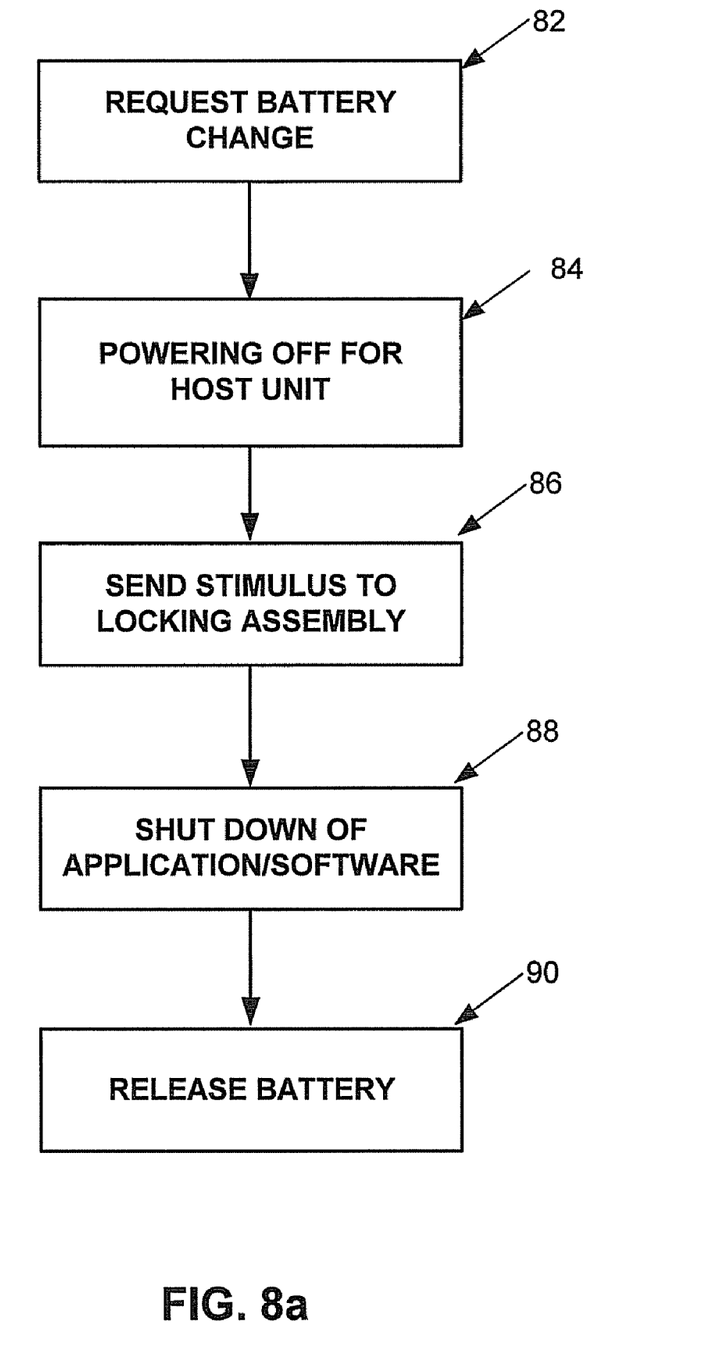
FIG. 8a is a flow chart diagram illustrating an exemplary method in accordance with an aspect of the present invention.
Figure 8B:
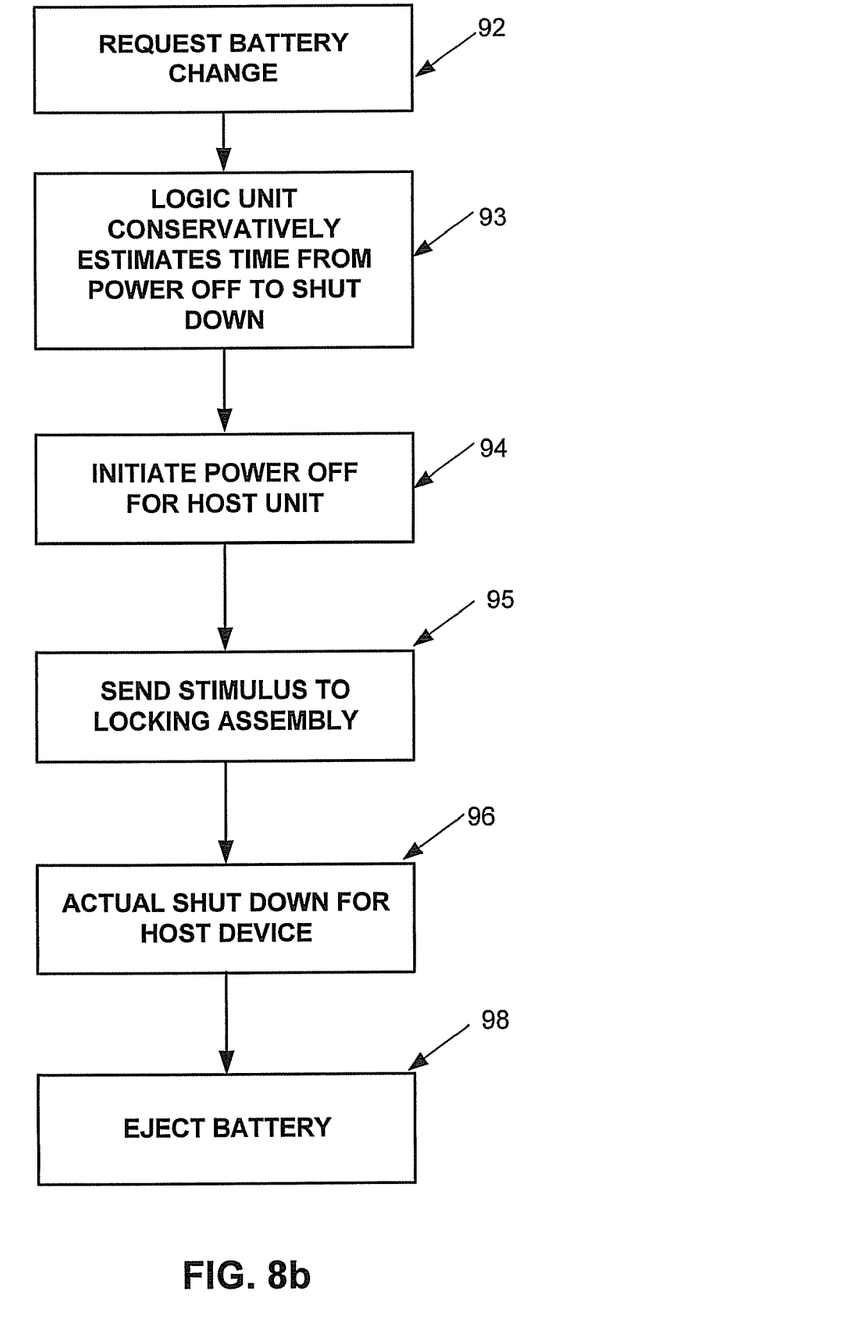
FIG. 8b is a flow chart diagram illustrating an exemplary method employing a logic unit in accordance with an aspect of the present invention.

Referring now to FIGS. 8a & 8b, a flow chart and sequence of events is illustrated according to another aspect of the present invention for removing a battery. The systems of FIGS. 8a & 8b employ a latch mechanism that includes an actuator as described earlier. In FIG. 8a, at 82 a user requests a battery change, for example by pressing a respective button for ejecting the battery. Next and at 84, the unit is being powered down. The powering down of the system may occur automatically upon request for a battery change, or performed manually by a user. Thereafter, at 86 a stimulus is provided to the latch mechanism and the application as well as other software associated with the host unit is shut down at 88. Upon actual shut down and close of the associated application and/or software, the latch mechanism will act on the stimulus provided, and initiates disengagement of the battery cell from the catch/latch assembly at 90. Accordingly, the illustrated methodology allows for a release of the battery that is tied up to the shut down of the associated application and/or designated software of the host unit. The release may further include automatically ejecting the battery from its compartment.

In FIG. 8b after a users request for battery change at 92, a logic unit associated with the host device performs a conservative estimate 93 of the time duration required for a proper shut down of the application and the associated software of the host unit. This conservative estimate can, for example, be based on prior periods between the powering off for the unit and the actual shutting down of the system during normal use of the host unit. It can also be based on the input provided by a user of the host unit requesting a predetermined time delay between powering off and battery ejection. Next, at 94 powering down is initiated for the host unit and its processor. Thereafter, at 95 a stimulus is provided by the logic element to the latch assembly. The application and/or associated software properly shut down at 96, after which the latch mechanism is opened at the end of the period estimated by the logic unit. Accordingly, such exemplary aspect of the subject invention provides for a flexible time period that can be adaptable to the requirements of the system. This typically assures that the system will not undergo a cold boot or lose data as a result of a power jolt from removal of the battery cell(s).

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising".

What is claimed is:

1. A battery cell for use in a battery release mechanism, comprising:
    a first latch mechanism that employs a side latch feature that extends from the exterior of the battery cell, such that when the side latch feature is deflected the side latch feature engages a projection of the battery cell to prevent the battery cell from further removal;
    a second latch mechanism that employs a strip having a wider width at one end and secured via a pin set over a trough, wherein the trough is formed on a surface of the battery cell, the strip is curved to form the projection of the battery cell and the pin set secures the strip;
    wherein upon exerting a downward force, part of the strip moves in to the trough, lowering the projection and disengaging the projection from contacting the side latch feature and releasing the battery cell.

2. The battery cell of claim 1, further comprising positive and negative battery sockets engaged by resilient contact portions of positive and negative finger leads which project into a battery cell cavity.

3. The battery cell of claim 2, further comprising a safety switching mechanism that triggers the automatic powering off of a host unit, if the battery cell is removed without initially powering off the host unit.

4. The battery cell of claim 3, wherein the safety switching mechanism is triggered via contact of the projection on the battery cell body with a lever, during sliding out of the battery sockets from the finger leads of a terminal internal connector of the battery cell.

5. The battery cell of claim 1, wherein the battery cell is electrically connected to contacts on an interior of a battery compartment which mate with corresponding contacts on an electronic device to supply it with power.

6. The battery cell of claim 1, wherein the battery cell is part of an array of battery cells assembled together as part of a power unit in an electronic device.

7. The battery cell of claim 1, wherein the strip is fabricated from a conductive material.

8. The battery cell of claim 1, wherein the battery cell is removably mounted to an electronic device and a latch mechanism secures the battery cell to a host unit.

9. A battery cell contained within a housing for use in a battery release mechanism, comprising:
    a first catch and latch mechanism that employs a pair of buttons extending from the exterior of the battery housing, the buttons includes a flex spring sheet mechanism attached to the interior of the battery housing, the spring sheet deflects when the buttons are displaced such that the buttons engage a projection of the battery cell, wherein upon inward squeezing of the buttons, the first latch and catch mechanism is released allowing the battery to slide out of the host device to a predetermined length;
    a second catch and latch mechanism that employs a notch mounted on a strip, wherein the notch engages with an edge of the host device to create a reactive force that acts in a direction opposite to a sliding direction of the battery cell, by pressing a disc shaped area on the strip, the strip moves downward and lowers the notch from its engaged position allowing sliding out of the battery cell from the housing;
    wherein upon exerting a downward force, part of the strip moves in to a trough, lowering the projection and disengaging the projection from contacting the side latch feature and releasing the battery cell.

10. The battery cell of claim 9, wherein the buttons hinge on pins on interior ends that contact the spring sheet mechanism.

11. The battery cell of claim 9, wherein the buttons have cams rotating on a shaft at ends to deflect the flex spring sheet.

12. The battery cell of claim 9, wherein the buttons are fabricated of thermoset plastic.

13. The battery cell of claim 9, wherein when the battery cell is slid out of the host device to a predetermined length, the battery cell remains electrically connected to the power from the host unit.

14. A battery cell contained within a battery compartment for use in a battery release mechanism, comprising:
    a latch assembly that includes a latching member and a latch cavity formed on a side wall of the battery compartment, wherein the latching member moves between an extended position and a retracted position;
    a lid hinged to the battery compartment which permits access to the battery compartment;
    wherein in the extended position, the latching member moves parallel to the lid and through a retaining member and locks into the cavity such that the lid is locked, denying access to the battery compartment, and wherein in the retracted position, the latching member moves out of the cavity and retaining member, allowing the battery compartment to be opened and the battery cell removed.

15. The battery cell of claim 14, further comprising an actuator operatively connected to the latch assembly of the battery compartment, the actuator employs the latching member to extend, locking the lid of the battery compartment and denying access to the battery cell.

16. The battery cell of claim 15, wherein the actuator employs the latching member to retract, allowing the lid of the battery compartment to be readily opened and the battery cell removed.

17. The battery cell of claim 16, further comprising an electromagnetic assembly employed in combination with the actuator to gradually release the battery cell from the battery compartment.

* * * * *

UNITED STATES PATENT AND TRADEMARK OFFICE
CERTIFICATE OF CORRECTION

PATENT NO. : 7,409,571 B2  
APPLICATION NO. : 11/693773  
DATED : August 5, 2008  
INVENTOR(S) : Wulff Page 1 of 1

It is certified that error appears in the above-identified patent and that said Letters Patent is hereby corrected as shown below:

IN THE DRAWINGS

1. In Fig. 7b, Sheet 8 of 10, below Box "POWER OFF HOST UNIT", delete "Tme" and insert -- Time --, therefor.
(ORIGINALLY FILED SPECIFICATION, IN THE DRAWINGS DATED MARCH 30, 2007, SHEET 8, FIG. 7B, BELOW BOX "POWER OFF HOST UNIT")

IN THE SPECIFICATION

2. In Column 1, Lines 56 - 64, delete "actuator element to move ..........................smaller and more portable." and insert the same in line 55, after "engaged by an" as a continuation of the paragraph.
(ORIGINALLY FILED SPECIFICATION DATED MARCH 30, 2007, PAGE 2, LINES 8-14)

IN THE CLAIMS

3. In Column 12, Line 33, in Claim 13, delete "slid" and insert -- slide --, therefor.
(AMENDMENTS TO THE CLAIMS DATED APRIL 10, 2008, PAGE 4, CLAIM 13, LINE 1)

Signed and Sealed this

First Day of December, 2009

David J. Kappos
*Director of the United States Patent and Trademark Office*